United States Patent [19]

De Kraker

[11] 4,397,372
[45] Aug. 9, 1983

[54] PENDULUM SUSPENDED BUMPER ASSEMBLY

[75] Inventor: Larry De Kraker, Holland, Mich.

[73] Assignee: Bell & Howell Company, Chicago, Ill.

[21] Appl. No.: 241,699

[22] Filed: Mar. 9, 1981

[51] Int. Cl.³ .................... B60R 19/02; B60L 3/04
[52] U.S. Cl. ................................. 180/277; 293/127; 200/61.44
[58] Field of Search ............... 180/277, 274, 279, 275; 293/4, 6-8, 15, 102, 120, 121, 126, 131, 136, 142, 127, 117; 248/345.1, 354 H, 354 C; 411/388, 389; 200/61.44

[56] References Cited

U.S. PATENT DOCUMENTS

| 760,910 | 5/1904 | Scott | 180/279 |
|---|---|---|---|
| 3,496,317 | 3/1970 | Reed | 200/52 R |
| 3,560,922 | 2/1971 | Wilson | 340/61 |
| 3,599,744 | 8/1971 | Satterfield | 180/279 |
| 3,654,412 | 4/1972 | Haruna et al. | 180/274 |
| 3,664,701 | 6/1972 | Kondur | 293/4 |
| 3,744,588 | 7/1973 | Nave, Sr. | 180/275 |
| 3,793,498 | 2/1974 | Matsui et al. | 200/61.45 R |
| 3,842,222 | 10/1974 | Hogland | 200/61.44 |
| 3,853,199 | 12/1974 | Hirashima et al. | 180/274 |
| 3,945,672 | 3/1976 | Wong | 293/5 |
| 4,000,408 | 7/1976 | McCartney | 307/10 BP |
| 4,020,918 | 5/1977 | Houskamp et al. | 180/168 |
| 4,042,058 | 8/1977 | Cooper | 180/168 |
| 4,124,087 | 11/1978 | Bortfeld | 293/127 |
| 4,126,344 | 11/1978 | Vaill | 293/4 |
| 4,137,984 | 2/1979 | Jennings et al. | 180/19 R |
| 4,320,913 | 3/1982 | Kuroda | 293/120 |

Primary Examiner—David M. Mitchell
Assistant Examiner—Timothy Roesch
Attorney, Agent, or Firm—Varnum, Riddering, Wierengo & Christenson

[57] ABSTRACT

A bumper assembly (12) is disclosed for use with a self-propelled vehicle (10) and includes a bumper (18) mounted to a bumper frame (16) pendulously suspended from a vehicle frame (14) by means of a plurality of hangers (20). When the vehicle (10) collides with an obstacle in its path, the bumper (18) and the bumper frame (16) pendulously swing and deflect at least one spring-loaded arm (32), thereby activating corresponding electrical switch assemblies (30) connected thereto to disconnect the driving power to the vehicle motor and decelerate the vehicle.

15 Claims, 4 Drawing Figures

PENDULUM SUSPENDED BUMPER ASSEMBLY

BACKGROUND OF THE INVENTION

1. Technical Field

This invention relates to bumper systems and, more particularly, to bumper systems for use with automatically controlled, self-propelled vehicles to prevent damage to the vehicle and other obstacles.

2. Background Art

Self-propelled, automatically controlled vehicles are used in business environments to provide mail delivery and similar functions. The structure and operation of such vehicles are disclosed in Cooper, U.S. Pat. No. 4,042,058 issued Aug. 16, 1977, and Houskamp et al, U.S. Pat. No. 4,020,918 issued May 3, 1977. The vehicles described therein are automatically controlled to follow a guide path in a predetermined manner. However, there exists a finite probability of collisions between vehicles and various obstacles, especially with several vehicles simultaneously operating on one guide path within an industrial or similar environment. Therefore, these vehicles often include bumper assemblies to minimize the effects of a collision and to indicate to various vehicle control components the occurrence of a collision.

The bumper assemblies disclosed in the aforementioned patents include a bumper and pressure sensitive switches to stop the vehicle when it collides with an obstacle in its path. Other prior art bumper assemblies also mechanically activate circuits and/or switches mounted directly to the bumper or vehicle frame, thereby causing a closure or opening of a conductive path interconnected with a vehicle power system which, in turn, causes the vehicle to decelerate. For example, as disclosed in Satterfield, U.S. Pat. No. 3,599,744, issued Aug. 17, 1971, a vehicle safety device comprises a foam bumper mounted to a pair of bumper frames connected to a vehicle frame by hinge pins. The bumper frames pivot about the hinge pins upon impact, thereby causing a switch mounted on the frame to be opened and the vehicle power system to be disengaged.

In Vaill, U.S. Pat. No. 4,126,344, issued Nov. 21, 1978, a bumper system is supported on a vehicle with springs and levers pivotably mounted between the bumper and the vehicle. When the bumper impacts with an obstacle, the springs and levers activate a power switch which stops the vehicle.

Jennings et al. U.S. Pat. No. 4,137,984, issued Feb. 6, 1979, discloses a self-guided load transporter having a bumper made of plastic tubing mounted to the transporter by cables, pulleys and springs. A motor deactivating switch mounted on the transporter frame is activated by an arm when the bumper strikes an obstacle.

DISCLOSURE OF THE INVENTION

In accordance with the invention, a bumper assembly for use with a self-propelled vehicle comprises a compressible means for cushioning the vehicle when the vehicle collides with an obstacle in its path, detection means for responding to the movement of the compressible means and supension means for suspending the compressible means from the vehicle in a pendulous manner.

The compressible means comprises a compressible, deformable bumper mounted on a frame member suspended from a vehicle frame on the vehicle. The detection means comprises at least one spring-loaded arm which is pivotably connected to a switch assembly and in contact with the frame member. Each switch assembly is mounted to the vehicle frame and has an activated and deactivated state. When the spring-loaded arm is deflected by the movement of the frame member, the corresponding switch assembly is switched from a deactivated to an activated state. When the switch assembly is activated, a conductive path is opened or closed, which can be utilized to disconnect a means for propelling the vehicle, thereby decelerating the vehicle. Typically, there are several switch assemblies spaced about the vehicle frame to detect movement of the bumper in various directions.

The suspension means comprises a cylindrical rod member retained at its upper portion to a first clip extending from the vehicle frame, the first clip having a hole with a diameter larger than the diameter of the rod member. When the lower portion of the rod member is secured to the bumper frame member in a similar fashion as the upper portion, the frame member and bumper mounted thereto are suspended from the vehicle frame and are able to swing in a pendulous manner. Thus, when the vehicle collides with an obstacle in its path, the bumper and frame members swing in a pendulous manner, deflecting a spring-loaded arm which activates a corresponding switch assembly causing a change in the conductive path which can be utilized to disconnect the means for propelling the vehicle and decelerate the vehicle.

BRIEF DESCRIPTION OF DRAWINGS

The invention will now be described with reference to the accompanying drawings in which.

BEST MODE FOR CARRYING OUT THE INVENTION

Figure 1:
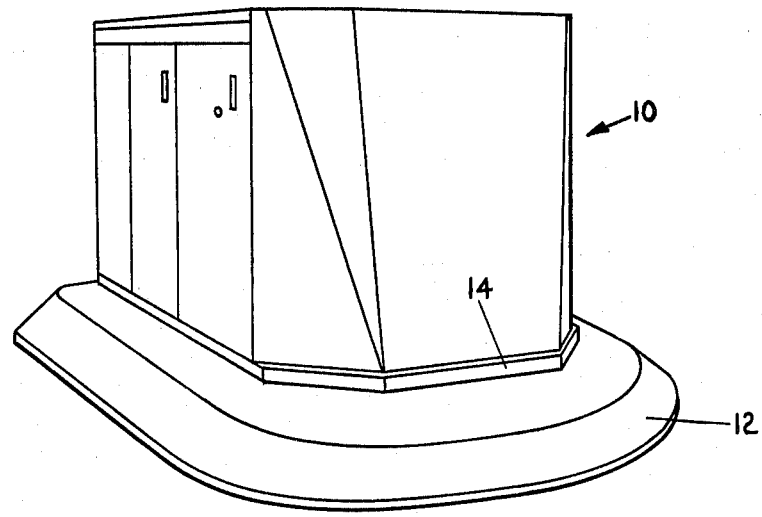
FIG. 1 is a perspective view of a self-propelled vehicle having a bumper system in accordance with the invention mounted thereto.

Referring now to FIG. 1, a self-propelled vehicle 10 is automatically guided on a guide line (not shown) positioned in a predetermined path on a floor. The vehicle 10 includes a vehicle frame 14, a vehicle power system (not shown) to propel the vehicle 10, and a bumper assembly 12 secured around the vehicle frame 14 and positioned at the bottom portion of the vehicle 10 just above the floor. The bumper assembly 12 extends outwardly and is of sufficient height to insure that physical contact with a foreign object or other vehicle is made with the bumper assembly 12 rather than with the vehicle 10 proper. Thus, the bumper assembly 12 protects the vehicle 10 from any physical damage as a result of a collision with an obstacle in its path.

Figure 2:
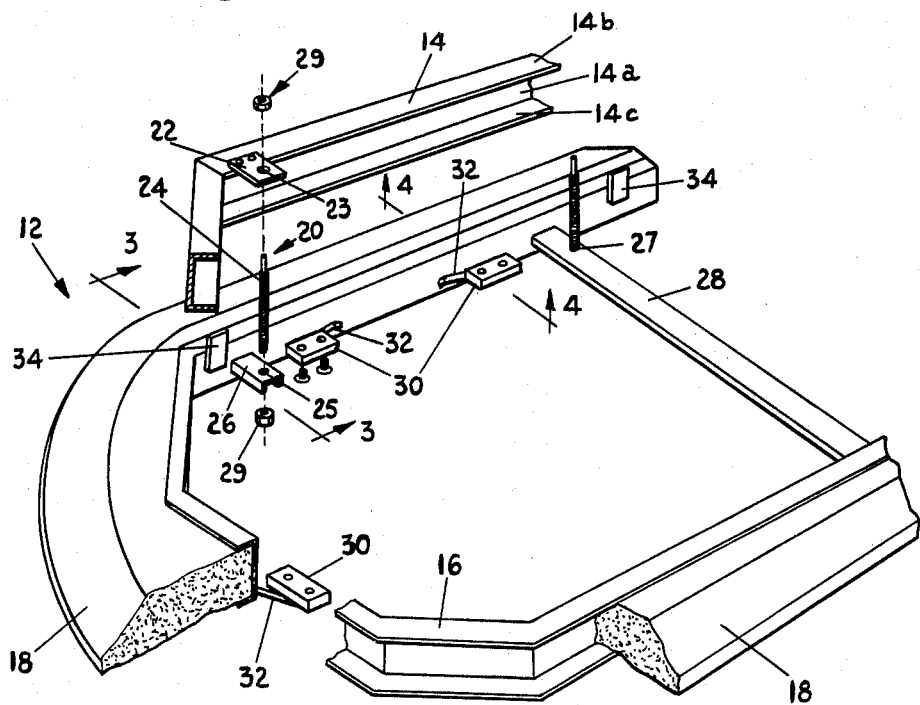
FIG. 2 is an exploded view of the bumper system in FIG. 1 partially broken away.
Figure 3:
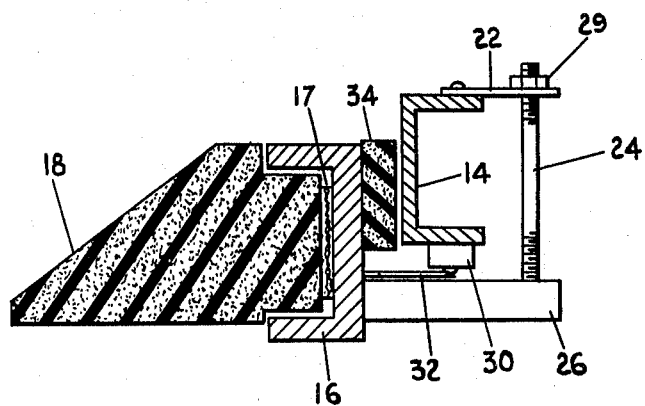
FIG. 3 is a side elevational view of FIG. 2 taken along lines 3—3.

As depicted in detail in FIGS. 2 and 3, the bumper assembly 12 includes a bumper frame 16 extending outwardly and suspended from vehicle frame 14, and a compressible bumper 18 which cushions the vehicle 10 upon impact with another vehicle, person or other obstacle. The bumper 18 is mounted to the bumper frame 16 with a mechanical fastener system 17. The mechanical fastener system 17 can, for example, comprise a resilient looped pile which is secured to the frame 16 and a pile of deformable interconnecting hooks which are secured to the bumper 18. This mechanical system is well known and sold under the trademark VELCRO. Adhesive materials or other fastener devices can also be utilized. The bumper 18 is made of a compressible, resilient foam material, such as expanded rubber or synthetic foam. It is preferable that the bumper 18 be structurally strong, but readily deformable upon impact with an obstacle so as to prevent vehicle damage.

As depicted in FIG. 2, the vehicle frame 14 comprises a vertical segment 14a and top and bottom horizontal flanges 14b and 14c extending from the vertical segment 14a. A plurality of hangers 20 are mounted to the vehicle frame 14 and suspend the bumper frame 16 therefrom. Each hanger 20 includes a threaded rod 24 mounted between a hanger clip 22 and a welded clip 26. The hanger clip 22 is fastened to and extends inwardly from the top flange 14b of the vehicle frame 14. The upper portion of the threaded rod 24 is inserted through an oversized hole 23 in the clip 22 and secured thereto with a nut 29. The rod 24 extends downwardly from the clip 22 and the lower portion of the rod 24 is inserted through an oversized hole 25 in the welded clip 26 and secured with a second nut 29. The oversized holes 23 and 25 have diameters larger than the diameter of the rod 24, and enable the rod 24 to freely swing in a pendulum-type movement in a multitude of directions of at least 180°. The welded clip 26 is welded to the bumper frame 16, thereby securing the bumper frame 16 to the vehicle 10 and enabling the bumper frame 16 to pendulously move in a multitude of directions of at least 180° including rearwardly and laterally of the vehicle frame 14. As also shown in FIG. 2, a horizontal cross-beam 28 welded to and extending across the bumper frame 16 may be used alternatively to the welded clip 26 to add further structural strength to the bumper assembly 12. With this cross-beam structure, the bottom end of the rod 24 is inserted in an oversized hole 27 in cross-beam 28 and secured thereto with fasteners.

When the vehicle 10 collides with an obstacle in its path, the bumper 18 will be deformed and compressed. Upon impact, the bumper 18 and frame 16 will be caused to swing in a pendulous manner a multitude of directions of at least 180° including rearwardly and laterally of vehicle frame 14.

As depicted in FIG. 2 and with greater detail in FIG. 3, at least one switch assembly 30 is mounted laterally of bumper frame 16 on the bottom flange 14c of the vehicle frame 14 with conventional fasteners. Each switch assembly 30 has an actuated and deactuated state. When each switch assembly 30 is activated, a conductive path is opened or closed functionally disabling the vehicle power system (not shown), thereby decelerating the vehicle 10. Any of several types of commercially available two-state switch assemblies capable of external mechanical activation can be utilized.

Figure 4:
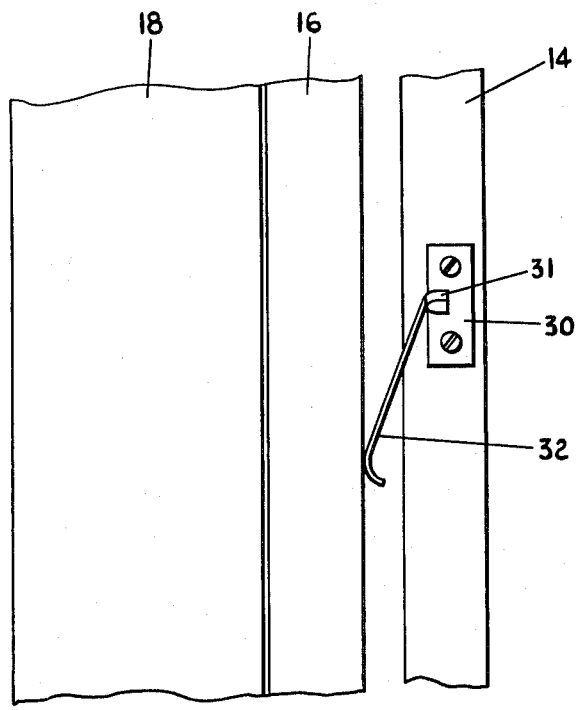
FIG. 4 is a bottom view of FIG. 2 along lines 4—4.

As depicted in FIGS. 3 and 4, pivotably mounted below each switch assembly 30 is a corresponding spring-loaded arm 32 in direct contact with the bumper frame 16. When the spring-loaded arm 32 is caused to rotate toward the vehicle about its pivot point, a switch 31 mounted on each switch assembly 30 is depressed, thereby switching or activating the switch assembly 30 from a deactuated to an actuated state. When vehicle 10 collides with an obstacle causing the bumper 18 to be deformed and the impact force is sufficient to displace the bumper frame 16, at least one spring-loaded arm 32 will be deflected, thereby activating the corresponding switch assembly 30 to disconnect the vehicle power system (not shown) and decelerate the vehicle 10. Thus, the switch assemblies 30 and corresponding spring-loaded arms 32 provide a detection means with actuated and deactuated states responsive to the pendulous movement of the bumper 18 and bumper frame 16 for switching between the actuated and deactuated states. Advantageously, while it is possible that the bumper 10 may be damaged as a result of a collision, it is unlikely that the switch assemblies 30 and the spring-loaded arms 32 will be damaged since the switch assemblies 30 and the arms 32 are shielded from direct contact with the obstacle.

The switch assemblies 30 will not be activated by all movement of the bumper 18. For instance, if the vehicle 10 runs over a floor or surface blemish, the extent of pendulous movement of the bumper frame 16 will not necessarily be sufficient to overcome the fixed spring tension in the spring-loaded arm 32. Additionally, a cushion pad 34, as best depicted in FIGS. 2 and 3, is positioned between the bumper frame 16 and the vehicle frame 14 to further eliminate or absorb or dampen unwanted movement of bumper 18 caused by thresholds or other floor surface blemishes. The cushion pad 34, made of conventional, compressible foam material, is mounted to the bumper frame 16 with VELCRO fasteners or other conventional adhesives.

In operation, impact of vehicle 10 with an obstacle causes an initial displacement of the bumper frame 16. If the displacement of bumper 18 is of sufficient magnitude such that it is not merely absorbed by the cushion pad 34, bumper 18 is compressed and bumper frame 16 will swing in a pendulous manner. The pendulous movement of the bumper frame 16 will, in turn, deflect at least one of the pivotably mounted, spring-loaded arms 32 if the movement is sufficient to overcome the fixed spring tension therein. When an arm 32 is deflected, the corresponding switch assembly 30 is activated and the vehicle power system (not shown) can be disconnected, thereby causing the vehicle 10 to decelerate or otherwise be deactivated. Upon striking an object under normal drive conditions, the bumper 18 is large enough so that the vehicle 10 should stop before the bumper 18 is fully compressed.

In summary, the bumper assembly 12 in accordance with the invention is suspended from the vehicle 10 and swings in a pendulous manner upon impact. Spring-loaded arms 32 pivotably mounted to corresponding switch assemblies 30 are directly in contact with the bumper frame 16 and detect movement of the bumper 18 and the bumper frame 16. The assemblies 30 and arms 32 are mounted to the bottom of the vehicle frame 14 behind the bumper frame 16 to avoid serious damage, although damage may occur to the bumper 18. When a replacement bumper 18 is needed, the VELCRO fasteners provide an easy and convenient method of removing a damaged bumper and of mounting a new bumper 18 onto the bumper frame 16.

While a particular embodiment of the invention has been depicted and described herein, it will be understood that the invention is not limited thereto since modifications may be made by those skilled in the art, particularly in light of the foregoing teaching. It is, therefore, contemplated by the appended claims to cover any such modifications which constitute the essential features of the invention within the true spirit and scope of the invention.

The embodiments of the invention in which an exclusive property or privilege is claimed are defined as follows:

1. A bumper assembly for a self-propelled vehicle and adapted to detect impact with an obstacle and preclude vehicle damage caused thereby, the vehicle comprising a vehicle frame with a front, back and lateral side, and means for propelling the vehicle, and the assembly comprising:

compressible means for cushioning the vehicle upon impact with an obstacle;

suspension means connected to the compressible means for suspending the compressible means from the vehicle frame in a manner enabling the compressible means to pendulously move in a multitude of directions of at least about 180° including rearwardly and laterally of the vehicle frame in response to vehicle impact with an obstacle;

detection means mounted between the vehicle frame and the compressible means, the detection means having activated and deactivated states and responsive to movement of the compressible means in any of said multitude of directions for switching between states; and the means for propelling the vehicle is responsive to the detection means to decelerate the vehicle upon switching of the detection means between the activated and deactivated states.

2. A bumper assembly according to claim 1 wherein the compressible means comprises:

a frame member suspended from the vehicle frame; and a compressible, deformable bumper removably secured to the frame member.

3. A bumper assembly according to claim 2 wherein the bumper is removably secured to the frame member with VELCRO fasteners.

4. A bumper assembly according to claim 2 wherein the detection means comprises:

at least one switch assembly for mounting to the vehicle frame and having a switch which, upon actuation, is adapted to cause the means for propelling the vehicle to disconnect and the vehicle to decelerate;

at least one spring-loaded arm member mounted on the at least one switch assembly, the arm member pivotably connected to the switch of the at least one switch assembly and for abutting the frame member; and the at least one spring-loaded arm member being adapted to actuate the at least one switch assembly when the movement of the frame member deflects the at least one arm member.

5. A bumper assembly according to claim 4 and further comprising:

means for damping the movement of the frame member with respect to the vehicle frame.

6. A bumper assembly according to claim 2 wherein the suspension means comprises:

a cylindrical rod member; and means for connecting an upper portion of the rod member to the vehicle and a lower portion of the rod member to the frame member, so that the rod member and the frame member connected thereto freely swing in said multitude of directions of with respect to the vehicle frame.

7. A bumper assembly according to claim 6 wherein the connecting means comprises:

means for retaining the upper portion of the rod member above an enlarged hole of a first clip secured on the vehicle frame, and the lower portion of the rod member below another enlarged hole of a second clip secured to the frame member, thereby enabling the frame member to be suspended from the vehicle frame and move in said multitude of directions.

8. In a self-propelled vehicle having a vehicle frame with front, back and vertical sides, means for propelling the vehicle along a predetermined path, and having a bumper assembly mounted to the frame and adopted to detect impact with an obstacle and to stop the forward motion of the vehicle upon impact, wherein the improvement in the bumper assembly comprises:

compressible means for cushioning the vehicle when the vehicle collides with an obstacle;

suspension means connected to the vehicle frame and the compressible means for suspending the compressible means from the vehicle frame in a manner enabling the compressible means to move in a multitude of directions of at least 180° including rearwardly and laterally of the vehicle frame in response to vehicle impact with an obstacle;

detection means mounted to the vehicle frame and the compressible means, the detection means having activated and deactivated states for responding to the movement of the compressible means with respect to the vehicle frame in said multitude of directions to switch between activated and deactivated states; and the means for propelling the vehicle being responsive to the detection means for decelerating the vehicle upon switching of the detection means between activated and deactivated states.

9. A self-propelled vehicle according to claim 8 wherein the compressible means comprises:

a frame member suspended from the vehicle frame; and a compressible, deformable bumper removably secured to the frame member.

10. A self-propelled vehicle according to claim 9 wherein the bumper is removably secured to the frame member with VELCRO fasteners.

11. A self-propelled vehicle according to claim 9 wherein the detection means comprises:

at least one switch assembly mounted to the vehicle frame and having a switch which, upon actuation, causes the means for propelling the vehicle to disconnect and the vehicle to decelerate;

at least one spring-loaded arm member corresponding to the at least one switch assembly, the arm manner pivotably connected to the switch of the at least one switch assembly and abutting the frame member; and the at least one spring-loaded arm member actuating the at least one switch assembly when the movement of the frame member deflects the at least one arm member.

12. A self-propelled vehicle according to claim 11 and further comprising:

means for damping the movement of the frame member with respect to the vehicle frame.

13. A self-propelled vehicle according to claim 9 wherein the suspension means comprises:

a cylindrical rod member; and means for connecting an upper portion of the rod member to the vehicle and a lower portion of the rod member to the frame member, thereby enabling the frame member to be suspended from the vehicle, and to freely swing in a pendulous manner in said multitude of directions with respect to the vehicle frame.

14. A self-propelled vehicle according to claim 13 wherein the connecting means comprises:
   a first clip on the vehicle frame and having a hole, the diameter of which is larger than the diameter of the rod member;
   a second clip secured to the frame member and having a hole, the diameter of which is larger than the diameter of the rod member; and
   means for retaining the upper portion of the rod member above the hole of the first clip and the lower portion of the rod member below the hole of the second clip, thereby enabling the frame member to be suspended from the vehicle frame and move in a pendulous manner in said multitude of directions with respect thereto.

15. A self-propelled vehicle according to claim 8 wherein the compressible means is of a width sufficient to extend the compressible means from the vehicle so as to allow the vehicle to stop upon striking an obstacle and switching of the detection means before complete compression of the compressible means.

* * * * *